United States Patent [19]
Haynes

[11] 3,766,908
[45] Oct. 23, 1973

[54] ELECTRONIC MEDICAL DIAGNOSTIC DEVICE

[75] Inventor: John L. Haynes, Redwood City, Calif.

[73] Assignee: Becton, Dickinson and Company, East Rutherford, N.J.

[22] Filed: Jan. 7, 1972

[21] Appl. No.: 216,128

[52] U.S. Cl............ 128/2 H, 73/344, 128/2.05 R, 128/2.05 P, 128/2.08, 324/115
[51] Int. Cl.............................................. A61b 5/00
[58] Field of Search...................... 128/2.05 P, 2 R, 128/2 H, 2.06 F, 2.06 G, 2.08, 2.1 R; 324/121, 115; 73/362 AR, 344

[56] References Cited
UNITED STATES PATENTS
| | | | |
|---|---|---|---|
| 3,593,704 | 7/1971 | Schwab............................ | 128/2 H X |
| 3,585,988 | 6/1971 | Creigh et al. .................... | 128/2.06 G |
| 2,098,695 | 11/1937 | Southwick ...................... | 128/2.06 G |
| 3,593,134 | 7/1971 | Seliber.............................. | 324/115 |

FOREIGN PATENTS OR APPLICATIONS
| | | | |
|---|---|---|---|
| 1,281,551 | 10/1968 | Germany........................... | 324/21 R |
| 1,035,755 | 8/1958 | Germany.......................... | 324/121 R |
| 639,233 | 6/1950 | Great Britain.................. | 128/2.06 R |

*Primary Examiner*—Kyle L. Howell
*Attorney*—David S. Kane et al.

[57] ABSTRACT

An electronic medical diagnostic device is provided capable of measuring a plurality of body functions such as respiration, pulse and temperature. The device includes a single meter scale which is divided into discrete, nonoverlapping portions with each portion defining a range for each of the body functions. Means are provided to limit the movement of the meter indicator to that portion of the meter scale associated with the body function being monitored and to prevent the meter indicator from registering in a portion of the scale allocated to a different body function.

5 Claims, 1 Drawing Figure

PATENTED OCT 23 1973 3,766,908
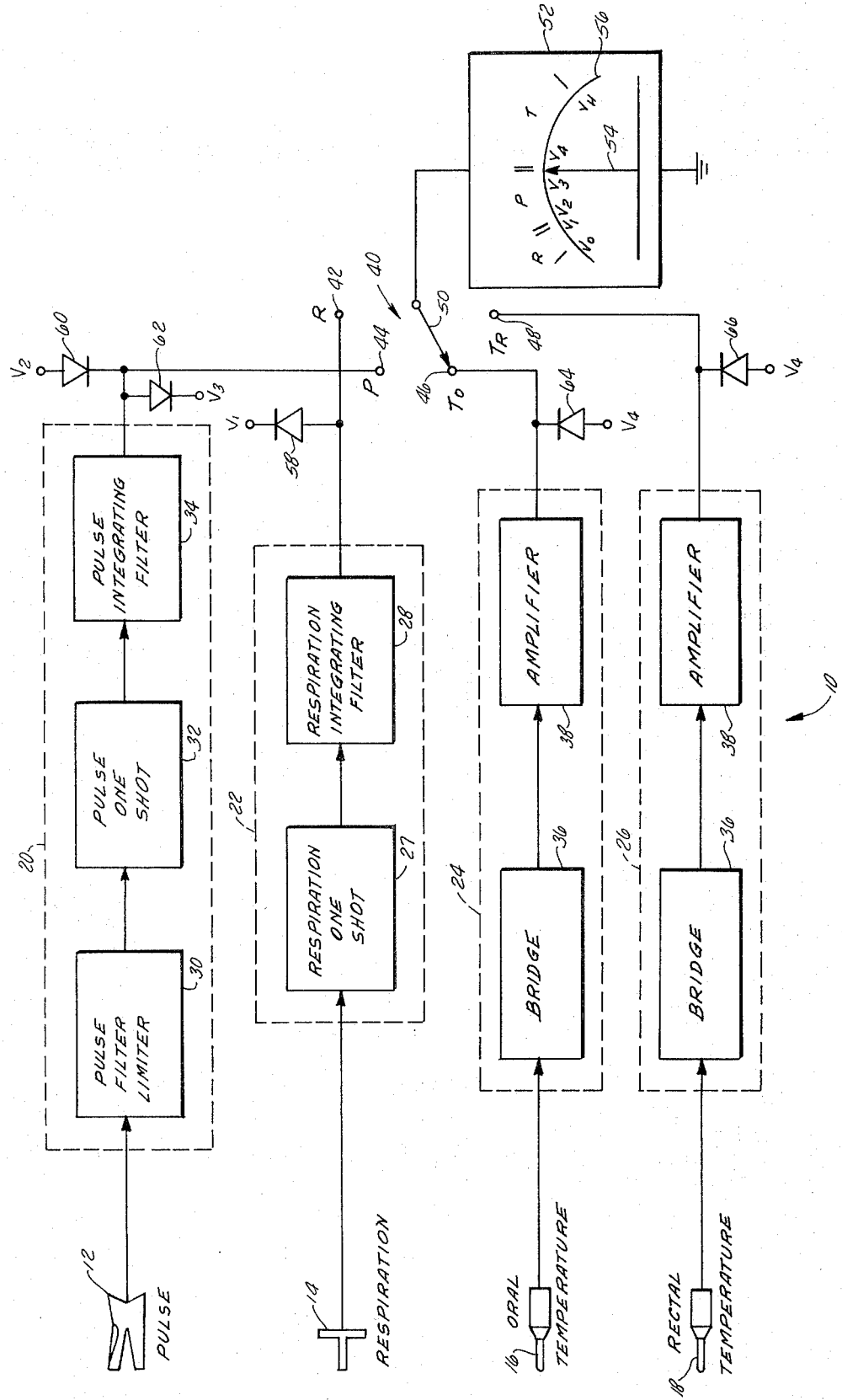

ELECTRONIC MEDICAL DIAGNOSTIC DEVICE

BACKGROUND OF THE INVENTION

A major factor associated with the increasing cost of hospital care is the expense involved in connection with the routine monitoring of patients, namely the daily check of pulse, respiration and temperature. In the main, such routine monitoring is performed by a nurse who must take the patients' temperature using a conventional mercury thermometer; manually check the patients' heart rate or pulse by counting the number of beats over a prescribed period of time, preferably a full minute but more usually 15 or 30 seconds; and then check the patients' respiration by observing the rise or fall of the patients' abdomen over a period of time. The latter observation is usually made while the nurse is still holding the patients' wrist so that he is unaware that respiration is being monitored.

In recent years a number of electronic medical diagnostic aids have been introduced. Such devices, often, are designed to enable the monitoring of more than one body function. One drawback of such devices is that the nurse must be trained to read a variety of meter scales to obtain the desired information relating to the patients' condition. This leads to a possible source of error due to a nurse attributing a particular scale reading to the wrong body function.

SUMMARY OF THE INVENTION

In view of the above, it is the principal object of the present invention to provide an electronic medical diagnostic device with an improved readout arrangement, wherein a single meter scale is provided divided into discrete portions, with each portion calibrated for a particular body function. The device further includes separate transducers for measuring the various body functions and suitable signal conditioning circuits associated with each transducer to shape the output of the transducer to suitably drive the meter. A switch which separately and discretely interconnects the several signal conditioning circuits with the meter is also provided. Means are also provided connected to the conditioner means adapted to limit the output of the conditioning circuits so as to enable the meter indicator to only traverse that portion of the meter scale associated with the particular body function being monitored by a particular transducer and to prevent the indicator from moving into an adjacent zone.

BRIEF DESCRIPTION OF THE DRAWING

The associated drawing is a block diagram representation of an electronic medical diagnostic device in accordance with the present invention.

DETAILED DESCRIPTION OF THE PRESENT INVENTION

The present electronic medical diagnostic device 10 comprises a plurality of transducers 12, 14, 16 and 18 each designed to generate an electrical signal representative of a particular body function being monitored, such as respiration, pulse and oral or rectal temperature. Accordingly, transducer 12 may comprise a pulse detector such as the "PULSE METER" finger pulse detector marketed by the Medical Systems Corporation of Great Neck, New York; transducer 14 may comprise a manual button which the nurse presses in response to each breath of the patient as a measure of the patient's respiration; and, transducers 16 and 18 comprise conventional electronic thermometer sensing probes, transducer probe 16 being designed for oral application and probe 18 being designed for rectal application.

Each of the transducers 12, 14, 16 and 18 has associated with it a signal conditioning circuit represented respectively on the drawing by the numerals 20, 22, 24 and 26. For the respiration transducer 14, the signal conditioner 22 comprises a multivibrator 27 adapted to fire with each depression of button 14 by the nurse and a suitable integrating filter 28 designed to convert the frequency of pulses from the one shot 26 to a voltage level.

The signal conditioning circuit 20 for the pulse rate transducer 12 comprises a pulse limiting filter 30 adapted to smooth the output from the "PULSE METER," a multivibrator 32 and integrating filter 34. Multivibrator 32 and filter 34 operate in the same manner and for the same purpose as multivibrator 26 and integrating filter 28 of the respiration conditioning circuit.

The signal conditioners 24 and 26 for the oral and rectal temperature probes 16 and 18 each consist of a conventional Wheatstone bridge circuit 36 and a suitable amplifier 38.

The output of each of the signal conditioner circuits 20, 22, 24 and 26 is connected to a fixed contact of switch 40. Accordingly, the output of the pulse signal conditioning circuit 20 is connected to contact 44, the output of the respiration signal conditioning circuit 22 is connected to contact 42, the output of the oral temperature signal conditioning circuit 24 is connected to contact 46, and the output of the rectal temperature signal conditioning circuit 26 is connected to contact 48. A movable contact or wiper 50 is provided adapted to wipe across each of the stationary contacts 42, 44, 46 and 48 and to form a discrete electrical connection with only one stationary contact at a time. Meter 52 is connected to movable contact 50. Meter 52 comprises a conventional d'Arsonval type voltmeter instrument having an indicator or needle 54 designed to traverse the full range of meter scale 56 in response to the driving voltage. Scale 56 is divided into three adjacent, nonoverlapping zones designated in the drawing by the letters R, P and T. Each zone is calibrated in suitable units according to the physiological function being monitored. Accordingly, the respiration zone R may, for example, span the range of between 10 and 40 beats per minute; the pulse zone P has a range from 40 to 160 beats per minute; and the temperature zone T ranges between 96° and 106° F.

As stated, meter 52 is a conventional d'Arsonval type voltmeter and indicator 54 is designed to traverse the full scale of the meter for an input voltage of between $V_o$ and $V_H$. Each of the signal conditioning circuits 20, 22, 24 and 26 is suitably powered and biased to drive the indicator 54 substantially lineally through that portion of scale 56 corresponding to its associated zone. That is, signal conditioner 22 is designed to produce a substantially lineally varying signal between $V_o$ and $V_1$ corresponding to a respiration rate of between 10 and 40 breaths per minute, which will maintain indicator 54 within zone R; signal conditioning circuit 20 is designed to produce a substantially lineally varying signal between $V_3$ and $V_4$ for a pulse rate of between 40 and 160 pulses per minute, which will maintain indicator 54 within zone P; and signal conditioning circuits 24 and 26 are each designed to produce a substantially lineally varying signal between $V_4$ and $V_H$ for a temperature range of between 96° and 106° F which will maintain indicator 54 within zone T. As may be noted from the drawing, $V_2$ is slightly greater than $V_1$ so that a separation zone between $V_2$ and $V_1$ exists between zones R and P. Similarly, $V_4$ is slightly greater than $V_3$ so that a separation zone between $V_4$ and $V_3$ exists between zones T and R.

In order to insure against the output voltage level of signal conditioning circuit 22 exceeding $V_1$; the output voltage level of circuit 20 from falling below $V_2$ or exceeding $V_3$; and the output voltage levels of circuits 24 and 26 from falling below $V_4$; clamping circuits are provided connected to the output of the various signal conditioning circuits. The clamping circuits are in the form of diodes biased at the desired limiting voltages. Accordingly, diode 58 which is biased at $V_1$ is connected to the output of signal conditioning circuit 22; diodes 60 and 62 biased respectively at $V_2$ and $V_3$ are connected to the output of signal conditioning circuit 20; diode 64 biased at $V_4$ is connected to the output of signal conditioning circuit 24 and diode 66 also biased at $V_4$ is connected to the output of signal conditioning circuit 26. The diodes, 58, 60, 62, 64 and 66 thus serve to contain the movement of indicator 54 to the zone (R, P or T) of scale 56 associated with the transducer utilized to monitor a particular physiological function. It is to be noted that there is no clamping for a minimum respiration value or a maximum temperature value since an off scale reading at either of these extremes cannot be misconstrued by an attending nurse as a reading of some other physiological function.

In a successful practice of the present invention, the full scale deflection of meter 52 was from minus 3 volts to plus 3 volts with zero volts at midpoint. The meter scale 56 comprised approximately 90° of arc with zone R comprising approximately 18° of arc, zone P comprising approximately 27° of arc, and zone T comprising approximately 45° of arc. The apportionment of the scale was derived from the accuracy with which readings could be taken with transducers 12, 14, 16 and 18. Zone R ranged from minus 3 to minus 1.95 volts. Zone P ranged from slightly above minus 1.95 volts to approximately 0 volts; and zone T ranged from slightly above 0 volts to plus 3 volts. By placing the zero point at midscale, the effect of any fluctuations in the power supply was minimized.

Having thus described the invention, what is claimed is:

1. In an electronic medical diagnostic device of the type having a plurality of transducers for measuring body functions and converting the body function measurements into electrical signals and transducer signal conditioning means for converting the output of the transducers into electrical signals capable of driving a meter, the improvement comprising: a readout meter having a single scale separated into a plurality of nonoverlapping zones each defined for one of said body functions; indicator means capable of traversing the entire scale of said meter in response to driving electrical signals from said signal conditioning means; switch means for selectively coupling the output of said conditioning means to said meter to drive said meter indicator; and circuit means connected to said signal conditioning means output, said circuit means including means to limit the output of said conditioning means so as to limit driving electrical signals whereby the movement of said indicator is constrained to one of said zones, said one zone being determined by the position of said switch means.

2. The invention in accordance with claim 1 wherein the movement of said indicator varies with the voltage of the output of said conditioning means and said circuit means includes means for clamping the upper limit of the output voltage of the conditioning means associated with said first zone to a level corresponding to the upper limit of said first zone.

3. The invention in accordance with claim 1 wherein the movement of said indicator varies with the voltage of the output of said conditioning means and said circuit means includes means for clamping the lower limit of the output voltage of the conditioning means associated with said last zone to a level corresponding to the lower limit of said last zone.

4. The invention in accordance with claim 1 wherein said meter scale is divided into at least three zones and said circuit means includes means for clamping the output voltage of the conditioning means associated with the middle zone at a lower level above the upper level of the adjacent zone on the lower side and an upper level below the lower level of the adjacent zone on the upper side whereby to define separation zones between said middle zone and said adjacent zones.

5. The invention in accordance with claim 1 wherein said meter scale extends between a negative voltage value and a positive voltage value; at least one of said transducers comprises a thermometer; and the zone associated with said thermometer terminates at one end at the zero point of the meter scale.

* * * * *